(12) United States Patent
Huang et al.

(10) Patent No.: US 6,227,810 B1
(45) Date of Patent: May 8, 2001

(54) BICYCLE AIR PUMP STRUCTURE

(76) Inventors: Ying-Che Huang, No. 3-1, Lane 572, Sec. 2, ChungCheng Road, ChungHwa City (TW); Chun-Ming Huang, No. 240, ChungHwa W. Road, ChangHwa City (TW)

( * ) Notice: Subject to any disclaimer, the term of this patent is extended or adjusted under 35 U.S.C. 154(b) by 0 days.

(21) Appl. No.: 09/098,512

(22) Filed: Jun. 17, 1998

(51) Int. Cl.[7] .................................................. F04B 49/00
(52) U.S. Cl. ............................................................ 417/63
(58) Field of Search ............................. 417/63, 550, 229, 417/231; 280/201, 202, 216, 295; 152/415

(56) References Cited

U.S. PATENT DOCUMENTS

| | | | |
|---|---|---|---|
| 3,451,276 | * | 6/1969 | Wadlow et al. . |
| 4,462,768 | * | 7/1984 | Westmoreland ........................ 417/518 |
| 4,677,328 | * | 6/1987 | Kumakura ........................... 310/67 R |
| 5,131,671 | * | 7/1992 | Wilhelms ................................ 280/201 |
| 5,318,317 | * | 6/1994 | Hopper .................................... 280/201 |
| 5,397,144 | * | 3/1995 | Mirand et al. ......................... 280/201 |
| 5,499,858 | * | 3/1996 | Her ....................................... 297/195.1 |
| 5,538,398 | * | 7/1996 | Elson ........................................ 417/53 |
| 5,626,072 | * | 5/1997 | Mirand et al. ........................... 92/256 |
| 5,860,660 | * | 1/1999 | Garcia .................................... 280/201 |
| 5,890,725 | * | 4/1999 | Wood ..................................... 280/201 |

* cited by examiner

*Primary Examiner*—Teresa Walberg
*Assistant Examiner*—Daniel Robinson

(57) ABSTRACT

A bicycle air pump includes a cylinder adapted to be secured to the bicycle frame having a cylinder bore within which a piston reciprocates, a crank shaft rotatably supported on the cylinder and drivingly coupled to the piston by means of a connecting rod and a driving mechanism for coupling the crank shaft to the bicycle chain to be driven thereby so that when the bicycle pedals are actuated to drive the bicycle chain, the bicycle chain forces the crank shaft to rotate and thus making the piston reciprocate within the cylinder bore to pump air through an outlet of the cylinder.

8 Claims, 9 Drawing Sheets

BICYCLE AIR PUMP STRUCTURE

FIELD OF THE INVENTION

The present invention relates generally to an air pump and in particular to an air pump structure which allows the pump to be fixed to a bicycle frame and driven by the bicycle chain so that the bicycle rider may be able to fix a tire pressure problem in any time and at any place.

BACKGROUND OF THE INVENTION

Bicycles have been widely used in transportation and exercise. The tire pressure of the bicycle is an important factor that affects the comfort of riding bicycle. The tire pressure has to be maintained at a predetermined level in order to get a comfortable riding experience. Furthermore, sometimes, the bicycle tires may be damaged and a flat tire occurs. Thus, an air pump is of importance for a bicycle rider.

Conventional air pumps, such as hand operating air pump indicated at 10 in FIG. 8 of the attached drawings or foot operating air pump indicated at 20 in FIG. 9, are not designed to be carried with the bicycle so that when the tire pressure gets lower than the predetermined level or a flat tire occurs, the bicycle rider is not able to obtain instant and handy means to fix the tire pressure problem.

Thus, it is desirable to provide a bicycle air pump which is mounted on the bicycle and driven by the operation of the bicycle so as to provide a handy way for supply air to the bicycle tire.

SUMMARY OF THE INVENTION

Therefor, an object of the present invention is to provide an air pump which is suitable to be mounted on the bicycle to be carried thereby so as to provide a handy air supply to the bicycle tire.

Another object of the present invention is to provide an air pump which is mounted to the bicycle frame to be carried thereby and which is driven by the operation of the bicycle so as to provide an efficient way of supplying air to the bicycle tire.

To achieve the above objects, in accordance with the present invention, there is provided a bicycle air pump comprising a cylinder adapted to be secured to the bicycle frame, having a cylinder bore within which a piston reciprocates, a crank shaft rotatably supported on the cylinder and drivingly coupled to the piston by means of a connecting rod and means for coupling the crank shaft to the bicycle chain to be driven thereby so that when the bicycle pedals are actuated to drive the bicycle chain, the bicycle chain forces the crank shaft to rotate and thus making the piston reciprocate within the cylinder bore to pump air through an outlet of the cylinder.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
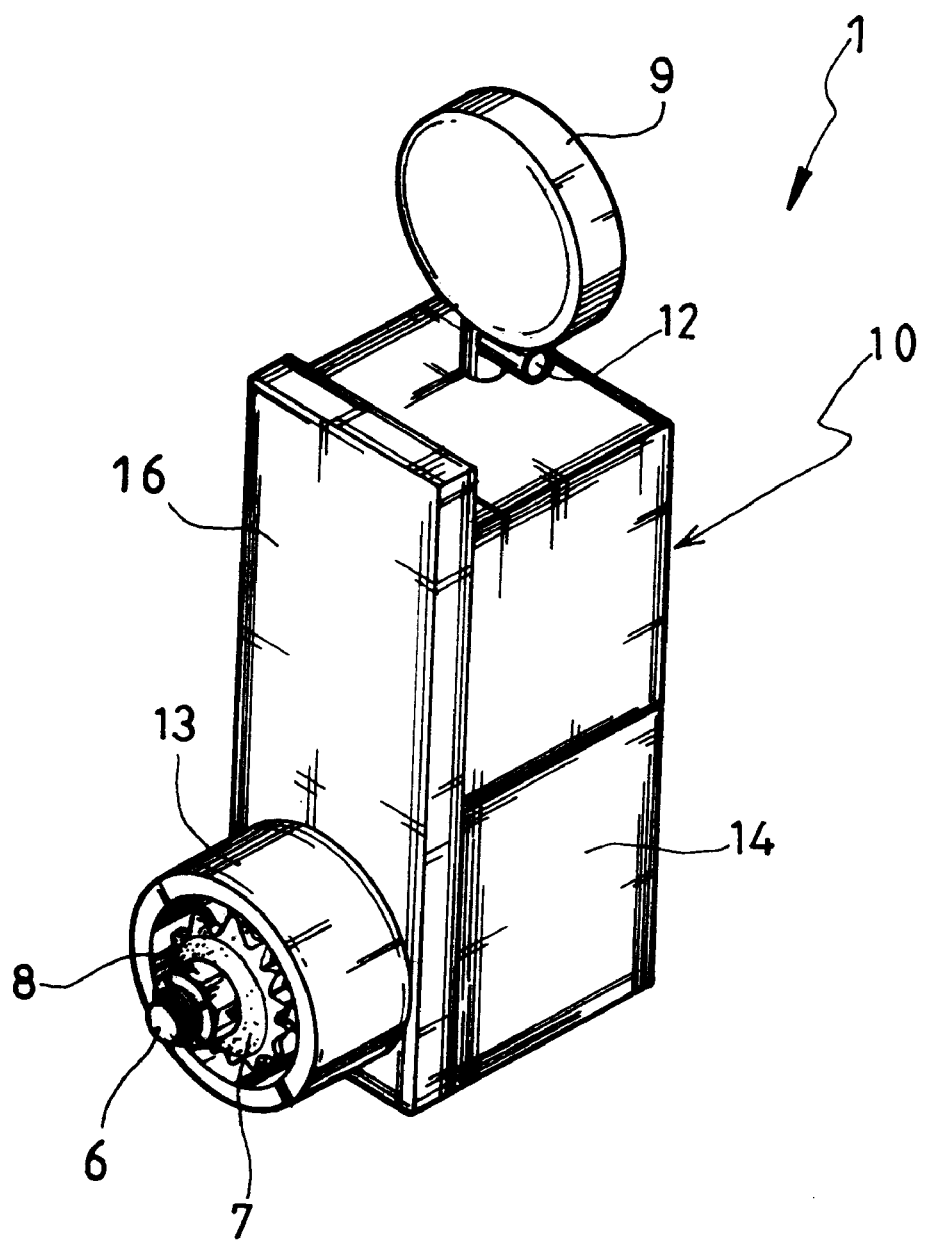
FIG. 1 is a perspective view showing a bicycle air pump constructed in accordance with the present invention.
Figure 2:
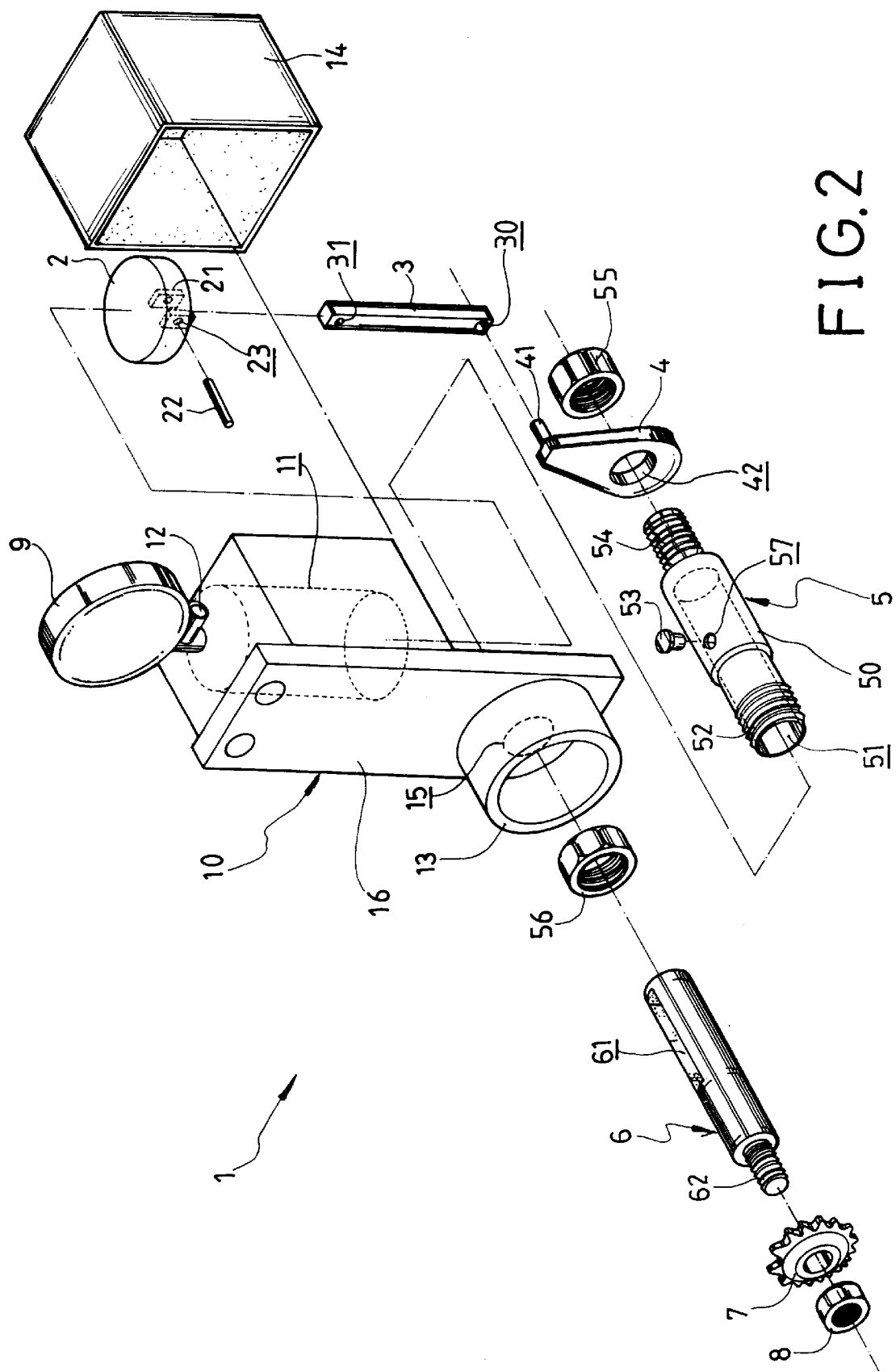
FIG. 2 is an exploded perspective view of the bicycle air pump in accordance with the present invention
Figure 3:
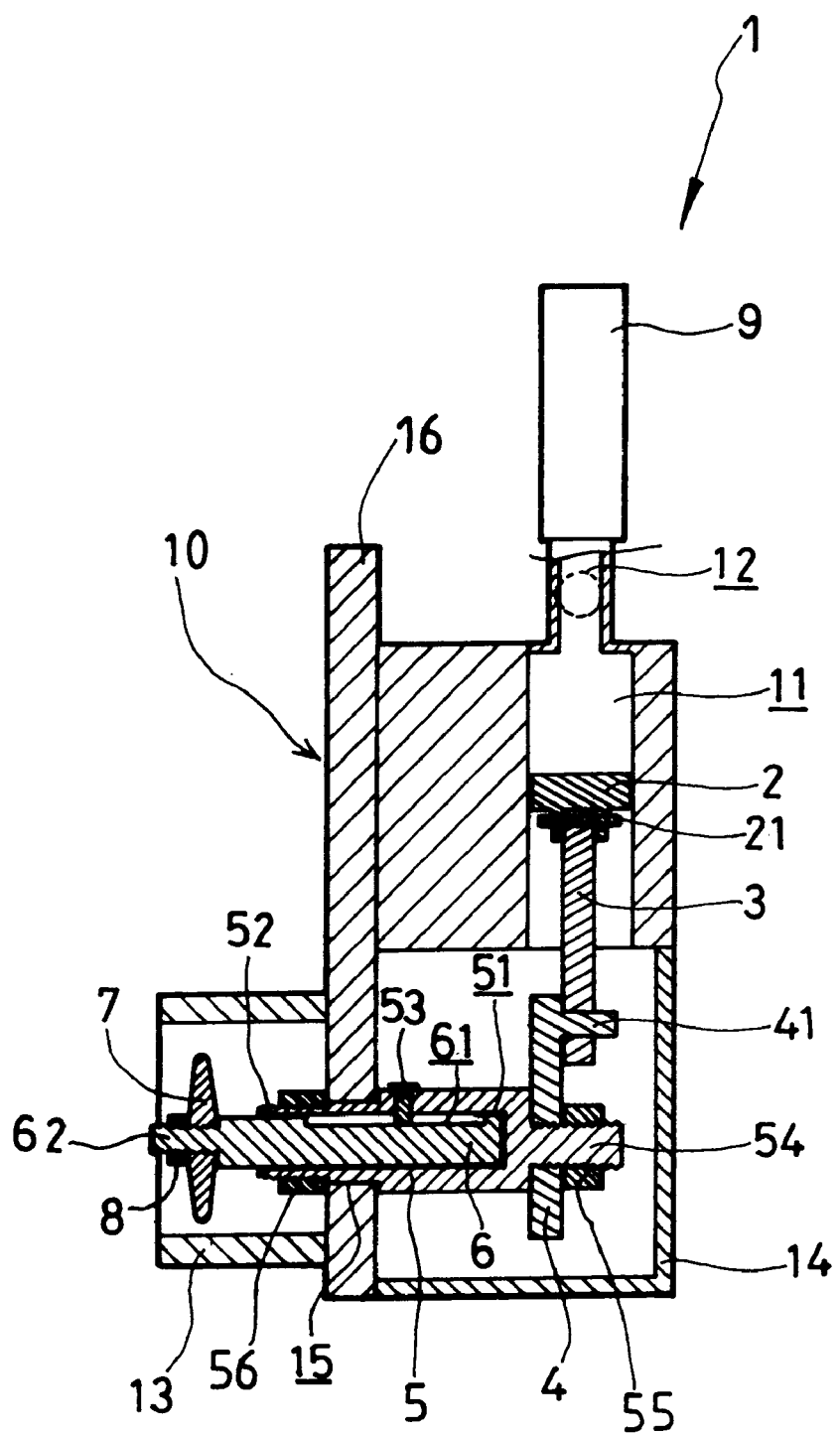
FIG. 3 is a cross-sectional view of the bicycle air pump of the present invention with the chain wheel of the bicycle air pump at the stowed position.

With reference to the drawings and in particular to FIGS. 1–3, wherein a bicycle air pump constructed in accordance with the present invention, generally designated with reference numeral 1, is shown, the bicycle air pump 1 comprises a cylinder 10 having a cylinder bore 11 formed therein within which a piston 2 is movably received. The cylinder 10 is adapted to be fixed to a bicycle frame (see FIGS. 5–7) with any known means, such as bolts. A crank shaft 5, which has a hollow portion, is coupled to the piston 2 by means of a connecting rod 3 to drive the piston 2 reciprocating inside the cylinder bore 11. A driving shaft 6 telescopically and axially movably received within the hollow crank shaft 5 and rotatably fixed thereto to be rotatable in unison therewith for driving the crank shaft 5. The driving shaft 6 has a chain wheel 7 fixed thereto, which chain wheel 7 is adapted to be coupled to and driven by a chain 40 of the bicycle (see FIGS. 5–7) so that when a rider (not shown) actuates pedals 30 of the bicycle to drive the bicycle chain 40, the piston 2 is forced to reciprocate within the cylinder 10 by means of the mechanical coupling provided by the chain wheel 7, the driving shaft 6, the crank shaft 5 and the connecting rod 3 and thus air is pumped and supplied through an outlet 12 of the cylinder 10.

In accordance with the present invention, the crank shaft 5 comprises an elongated shaft body 50 extending through and rotatably supported within a hole 15 formed on the cylinder 10. Preferably the cylinder 10 is provided with a side wall plate 16 having an extension beyond a lower end of the cylinder 12 with the hole 15 formed on the lower extension of the side wall plate 16. The crank shaft 5 also comprises an arm 4 which is fixed to a first end of the shaft body 50. The arm 4 has a coupling pin 41 fixed thereto and extending therefrom in a direction substantially parallel with the elongated shaft body 50 to be rotatably received within a corresponding hole 30 formed on the connecting rod 3 so as to form a rotatable or pivotal joint therebetween.

In the embodiment illustrated, the first end of the elongated shaft body 50 is provided with a reduced diameter so as to define a shoulder. The arm 4 is provided with a hole 42 corresponding to and fit over the first end of the shaft body 50 and retained thereon by the shoulder of the shaft body 50. Preferably, the first end of the shaft body 50 is provided with a threading 54 to which a nut 55 is engaged to secure the arm 4 to the elongated shaft body 50 so as to force the coupling pin 41 to rotate about the elongated shaft body 50 when the shaft body 50 rotates.

The elongated shaft body 50 is also provided with a reduced second end which defines a shoulder placed against the hole 15 of the cylinder 10 and an external threading 52 on the second end to which a nut 56 is engaged to secure the elongated shaft body 50 to the side wall plate 16 of the cylinder 10 in such a way to allow the shaft body 50 to be rotatable with respect to the cylinder 10. In this respect, it may be desired to have bearing means (not shown) arranged between the hole 15 and the shaft body 50.

The connecting rod 3, besides the hole 30, has a second hole 31 through which a pin 22 extends. The pin 22 also extends through holes 23 formed on support plates 21 fixed to the piston 2 so as to form a rotatable or pivotal joint between the piston 2 and the connecting rod 3. With such an arrangement, when the crank shaft 5 rotates, the piston 2 is driven to reciprocate within the cylinder bore 11.

The elongated shaft body 50 of the crank shaft 5 has a central axial bore 51 into which the driving shaft 6 is axially slidably received. The driving shaft 6 is provided with an elongated, axially-extending slot 61, serving as a keyway. The elongated shaft body 50 is provided with a radially extending hole 57 into which a pin 53 is received. The pin 53 extends through the hole 57 and partially received within the slot 61 of the driving shaft 6 to serve as a key so that by means of the key-keyway engagement of the pin 53 and the slot 61 of the driving shaft 6, the rotation of the driving shaft 6 is transmitted to the crank shaft 5.

In addition to the driving connection provided by the engagement between pin 53 and the slot 61 of the driving shaft 6, the slot 61 and the pin 53 also serve to prevent the driving shaft 6 from sliding off the central bore 51 of the elongated shaft body 50 of the crank shaft 5. This is done by means of the stopping engagement between the pin 53 and axial ends of the driving shaft 6.

The driving shaft 6 has an axial length so as to have an end thereof extending out of the crank shaft 5 and the chain wheel 7 is secured to the end of the driving shaft 6. This may be done by forming threading 62 on the end of the driving shaft 6 with a nut 8 engaged thereto to secure the chain wheel 7 to the driving shaft 6 in such a way to have the driving shaft 6 and the chain wheel 7 rotatable in unison with each other.

Figure 4:
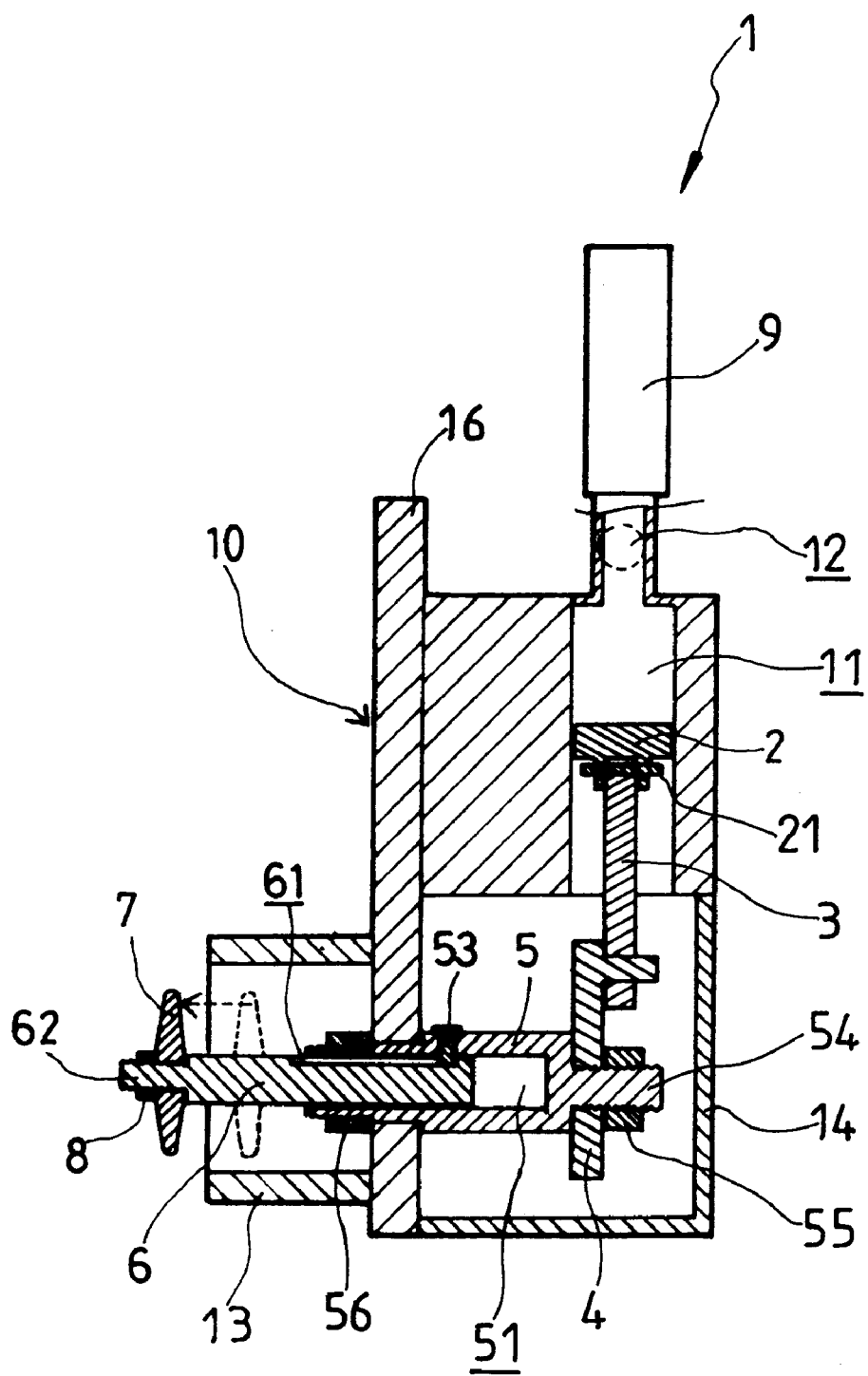
FIG. 4 is a cross-sectional view similar to FIG. 3, but showing the chain wheel of the bicycle air pump at the working position.

The elongated slot 61 allows the driving shaft 6 to be axially movable relative to the crank shaft 5 so that the chain wheel 7 that is secured to the driving shaft 6 is moveable relative to the side wall plate 16 of the cylinder 10 between a stowed position (see FIG. 3) and a working position (see FIG. 4).

To shield the chain wheel 7 in the stowed position, a cylindrical shielding member 13 is fixed to the side wall plate 16 of the cylinder 10 and is arranged to be substantially co-axial with the hole 15. The cylindrical member 13 has a size that is sufficient to shield the chain wheel 7 in the stowed position, but allows the chain wheel 7 to be exposed in the working position.

If desired, a pressure gauge 9 may be attached to the cylinder and in fluid communication with the outlet 12 of the cylinder 10 to indicate the pressures of the pumped air supplied by the air pump 1 of the present invention.

A cover member 14 may be provided to cover and protect the crank shaft 5 and the connecting rod 3.

Figure 5:
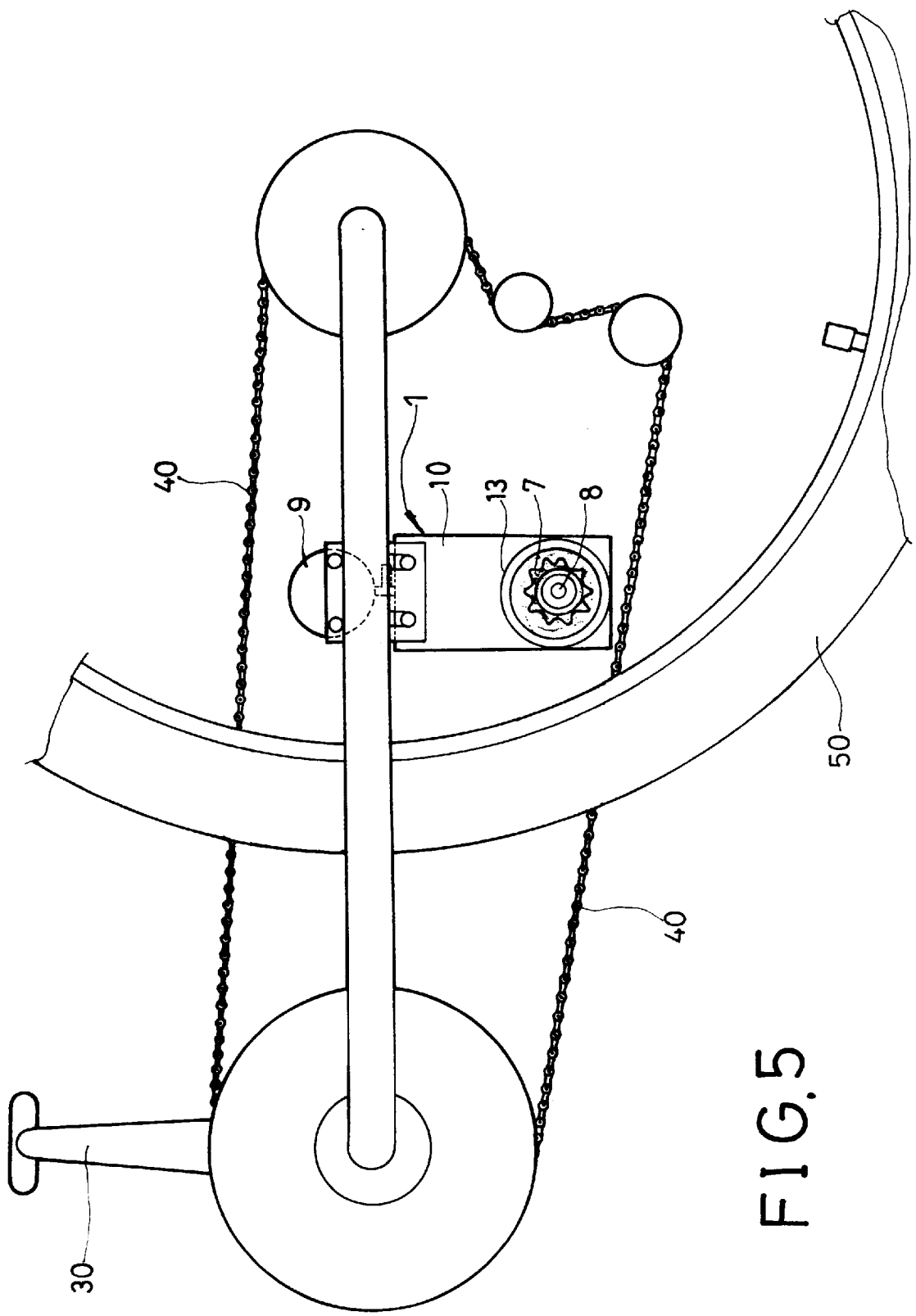
FIG. 5 is a schematic side elevational view showing the bicycle air pump of the present invention mounted to the frame of a bicycle.
Figure 6:
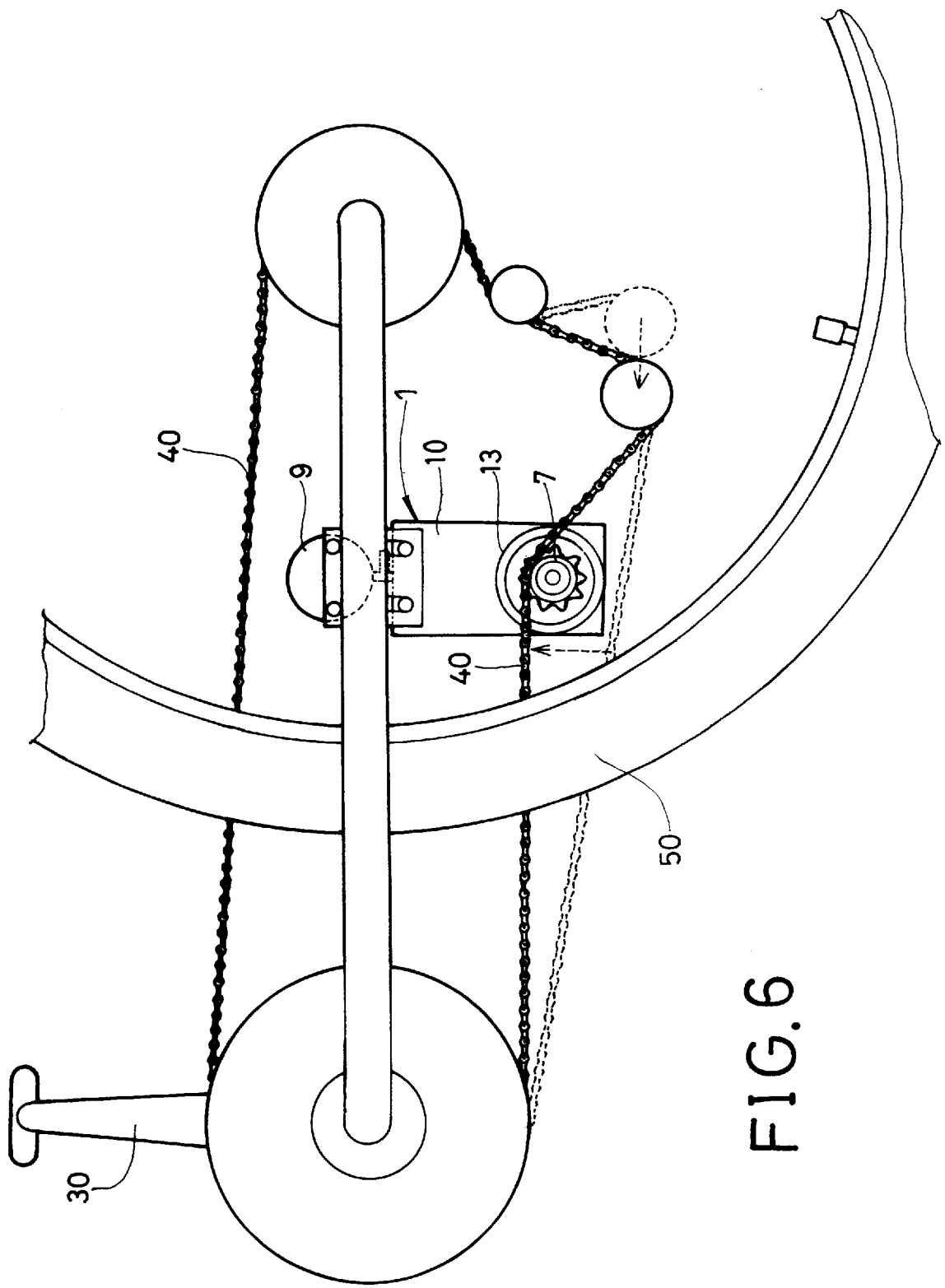
FIG. 6 is a schematic side elevational view similar to FIG. 5, but showing the chain wheel of the bicycle air pump of the present invention engaged and driven by the bicycle chain of the bicycle.
Figure 7:
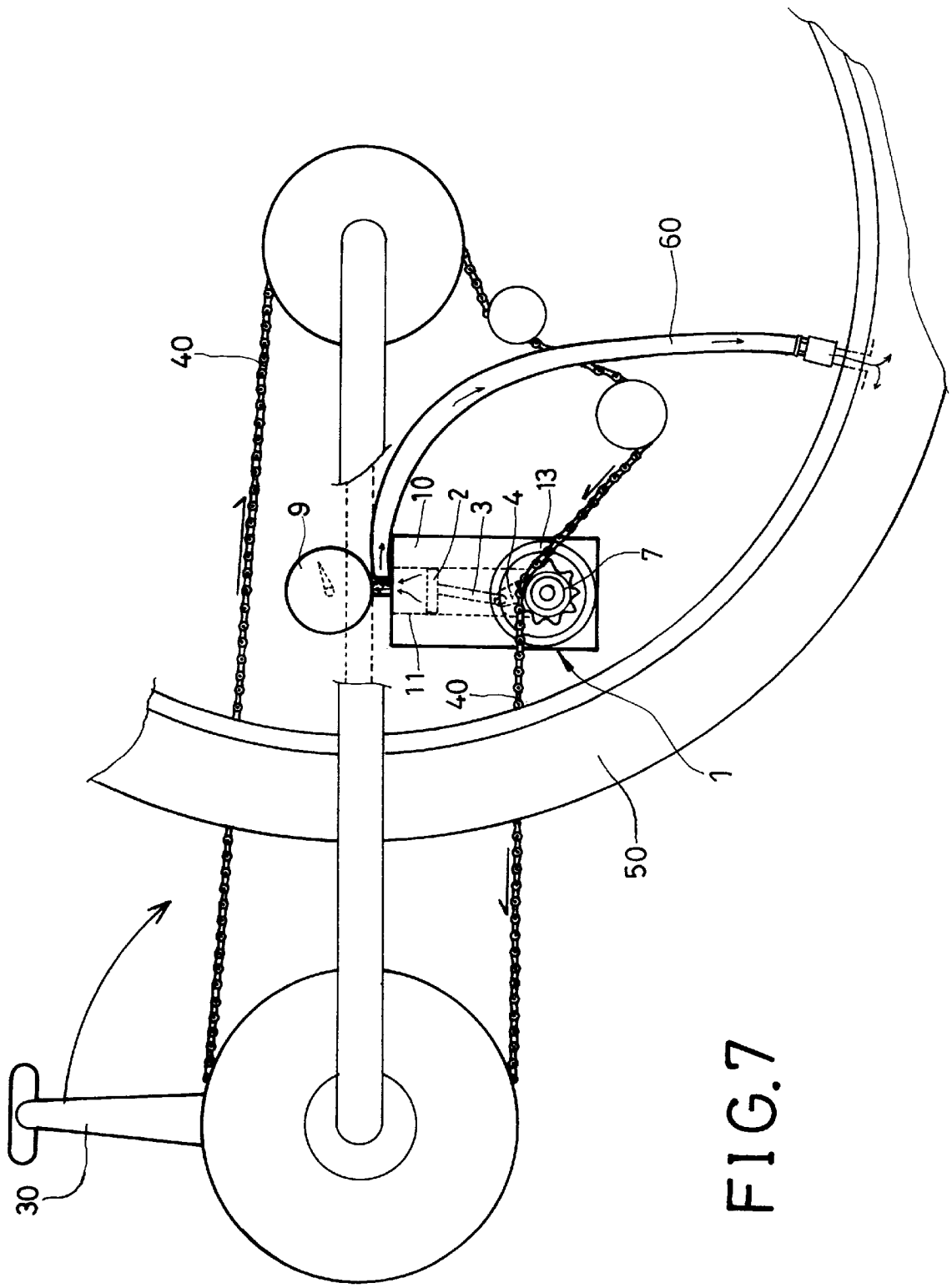
FIG. 7 is a schematic side elevational view similar to FIG. 6, but showing a flexible tube is used to connect the outlet of the bicycle air pump to a bicycle tire.
Figure 8:
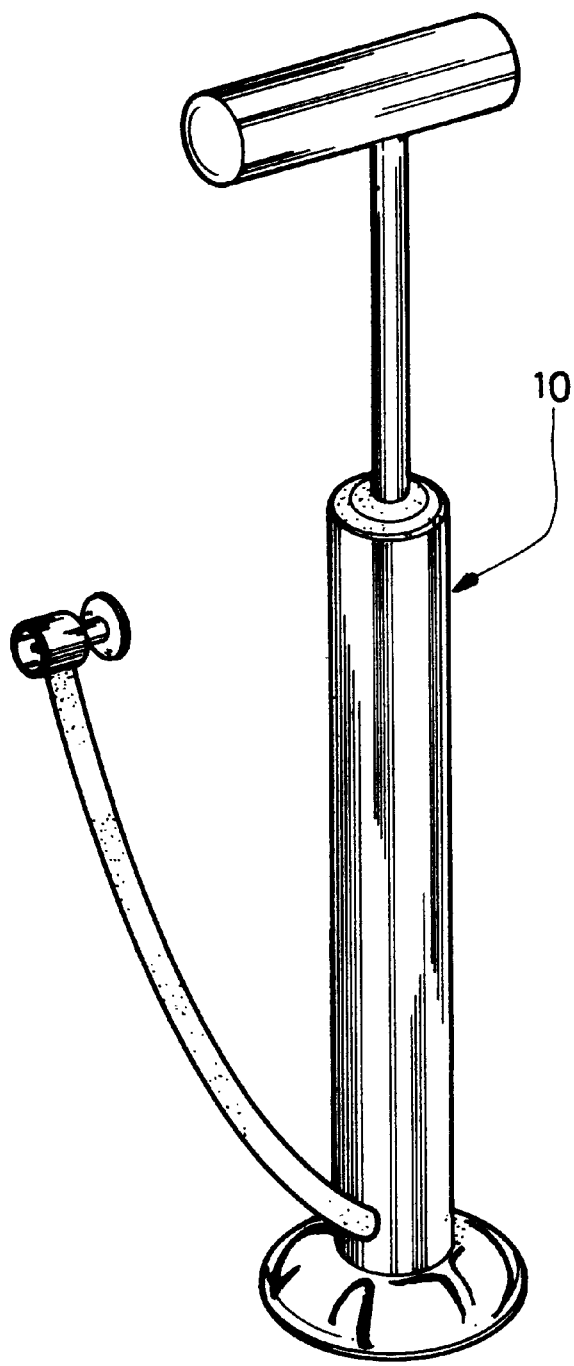
FIGS. 8 and 9 are perspective views of two conventional air pump structures.
Figure 9:
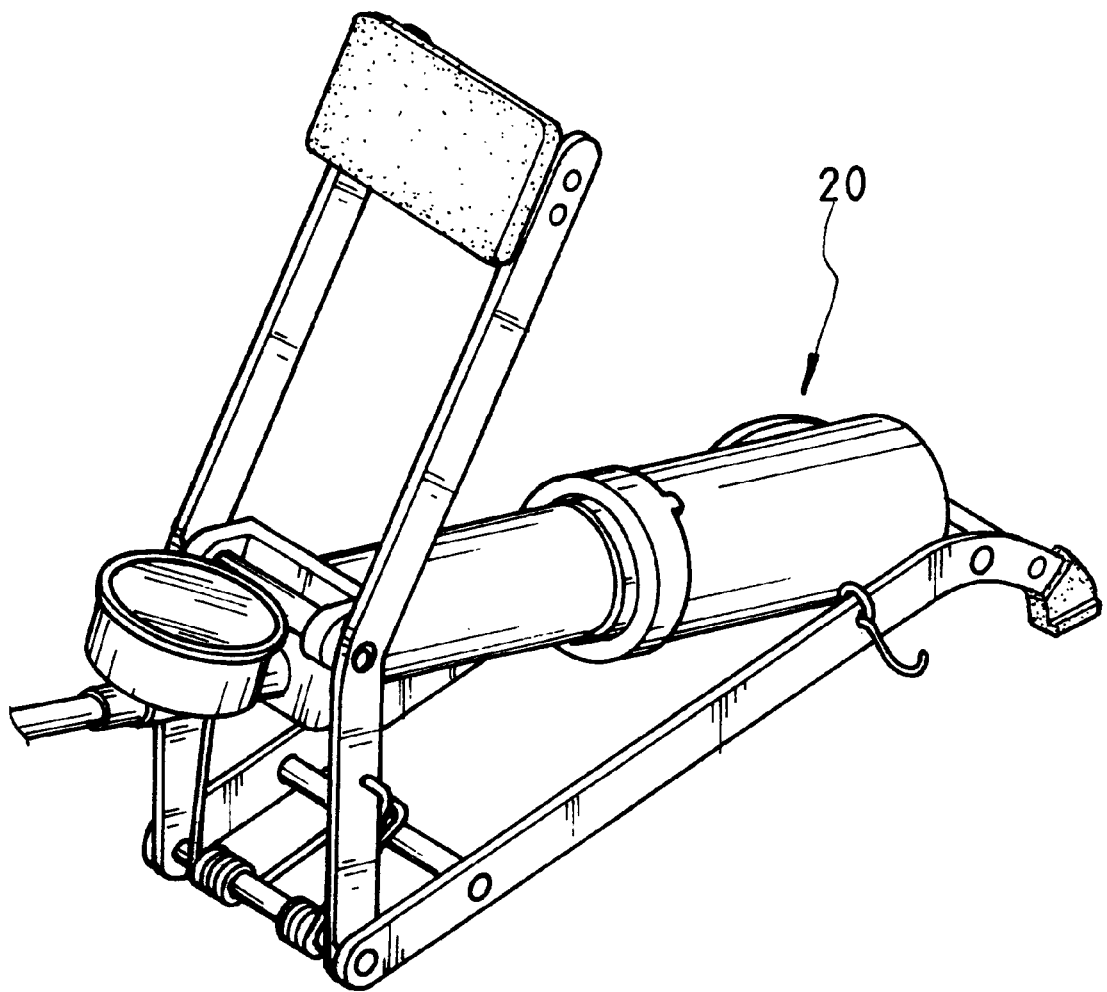

As shown in FIGS. 5–7, the air pump 1 of the present invention may be fixed to a suitable position on the bicycle frame so as to allow the chain wheel 7 (at the working position) to be engaged by the chain 40 by manually deflecting the chain 40 (FIGS. 6 and 7) and thus when the rider depresses the pedals 30, the chain 40 is driven to rotate the chain wheel 7 which in turn drives the piston 2 to reciprocate within the cylinder bore 11 to pump air through the outlet 12. A flexible tube 60 (see FIG. 7) may be used to connect between the outlet 12 of the air pump 1 and for example a tire 50 to supply the pumped air into the tire 50. Of course, the flexible tube 60 may be used to connect the air pump 1 to any desired destination to supply pressurized air thereto.

Preferably, the cover 14 is made in such a way to provide an interior space therein which space is sufficient to accommodate the flexible tube 60 therein.

Although the a preferred embodiment has been described to illustrate the present invention, it is apparent that changes and modifications in the specifically described embodiment can be carried out without departing from the scope of the invention which is intended to be limited only by the appended claims.

What is claimed is:

1. An air pump structure adapted to be secured to a frame of a bicycle, the bicycle having a bicycle chain coupled to pedals, the air pump comprising:
   a cylinder adapted to be secured to the bicycle frame having a cylinder bore within which a piston reciprocates; and
   a crank shaft rotatably supported on the cylinder and drivingly coupled to the piston by a connecting rod and a central axial bore for coupling the crank shaft to the bicycle chain to be driven,
      wherein said central axial bore is formed in the crank shaft within which a driving shaft is axially movable received, the driving shaft having an outer end extending out of the central bore of the crank shaft to which a chain wheel adapted to be engaged by the bicycle chain is fixed, the driving shaft having an axial length slot and the crank shaft having a radially-extending hole within which a pin is received in such a way to have an end of the pin engaging the slot so as to form a driving engagement between the pin of the crank shaft and the slot of the driving shaft, and
      wherein the axial length slot allows the chain wheel to be movable relative to the crank shaft between a stowed position and a working position, where the chain wheel is adapted to be engaged by the bicycle chain,
      so that when the bicycle pedals are actuated to drive the bicycle chain, the bicycle chain forces the crank shaft to rotate and thus making the piston reciprocate within the cylinder bore to pump air through an outlet of the cylinder.

2. The air pump as claimed in claim 1, wherein the outer end of the driving shaft is provided with threading to which a nut is engaged to secure the chain wheel to the outer end of the driving shaft.

3. The air pump as claimed in claimed 1, wherein the crank shaft comprises an elongated shaft body having a first end and a second end, the first end of the shaft body being threaded, an arm having a hole being fit over the first end and secured thereto by means of a nut engaged the threading of the first end, the arm having an eccentric pin rotatably received within a hole formed on the connecting rod.

4. The air pump as claimed in claim 3, wherein the cylinder is provided with a bearing hole through which the elongated shaft body rotatably extends and wherein the elongated shaft body has threading on the second end therefore to which a nut is engaged to fix the elongated shaft body to the cylinder in such a way to allow the elongated shaft body to be rotatable within the hole of the cylinder.

5. The air pump as claimed in claim 1, further comprising a pressure gauge connected to the outlet of the cylinder.

6. The air pump as claimed in claim 1, further comprising a cover to shield the crank shaft and the connecting rod.

7. The air pump as claimed in claim 1, further comprising a flexible tube connectable with the outlet of the cylinder adapted to supply pumped air to an article requiring the air.

8. The air pump as claimed in claim 1, further comprising a shielding member to shield the chain wheel at the stowed position.

* * * * *